United States Patent
Chang

(12) 
(10) Patent No.: US 9,686,841 B2
(45) Date of Patent: Jun. 20, 2017

(54) GLASS LOUDSPEAKER EMITTING SOUND AND ACCOUSTICALLY-DRIVEN LIGHT

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 28 days.

(21) Appl. No.: 14/816,644

(22) Filed: Aug. 3, 2015

(65) Prior Publication Data

US 2016/0192047 A1 Jun. 30, 2016

(30) Foreign Application Priority Data

Dec. 31, 2014 (CN) .......................... 2014 1 0845649

(51) Int. Cl.
*H04R 1/02* (2006.01)
*H05B 37/02* (2006.01)
(Continued)

(52) U.S. Cl.
CPC ....... *H05B 37/0236* (2013.01); *G02B 6/0011* (2013.01); *H04R 7/045* (2013.01); *H05B 33/0842* (2013.01); *F21V 33/0056* (2013.01); *G02B 5/0226* (2013.01); *G02B 5/18* (2013.01); *G02B 6/0051* (2013.01); *H04R 1/025* (2013.01);
(Continued)

(58) Field of Classification Search
CPC .. H04R 2201/021; H04R 7/045; H04R 1/028; H04R 1/025; H04R 1/26; H04R 2499/15; F21V 33/0056; G02B 27/30; G02B 5/18; G02B 6/005; G02B 6/0065; G02B 6/0076; G02B 27/0101; G02B 5/0226; G02B 6/0011; G02B 6/0051; H05B 37/0236; F21K 9/30; F21K 9/90; C23C 16/26; G02F 2001/133616; G09F 13/18
See application file for complete search history.

(56) References Cited

U.S. PATENT DOCUMENTS 4,355,348 A * 10/1982 Williams ............. G01R 13/408
362/231
5,838,529 A * 11/1998 Shufflebotham ........ G03F 7/707
279/128

(Continued)

FOREIGN PATENT DOCUMENTS

BE WO 2007065909 A1 * 6/2007 ....... B23B 17/10036
GB WO 0035242 A2 * 6/2000 ............... H04R 7/04

*Primary Examiner* — Davetta W Goins
*Assistant Examiner* — Kuassi Ganmavo
(74) *Attorney, Agent, or Firm* — Steven Reiss

(57) ABSTRACT

A glass loudspeaker emitting sound and acoustically-driven light includes a glass substrate, a plurality of exciters, a light bar, a plurality of coupling collimators, a diffractive grating, and a control unit. The exciters are arranged at intervals on the glass substrate. The light bar is arranged toward the glass substrate and includes a plurality of light sources. The coupling collimators are arranged on the light-emitting path of the light sources. The diffractive grating is arranged on the glass substrate and toward the light bar. The control unit is electrically connected with the light bar and the exciters, and includes an acoustic signal receiving unit, an audio signal amplifier, an audio signal analyzer, and a current distributor.

12 Claims, 5 Drawing Sheets

(51) Int. Cl.
*F21V 33/00* (2006.01)
*H04R 3/00* (2006.01)
*F21V 8/00* (2006.01)
*H04R 7/04* (2006.01)
*H05B 33/08* (2006.01)
*G02B 5/18* (2006.01)
*G02B 5/02* (2006.01)

(52) U.S. Cl.
CPC .............. *H04R 1/026* (2013.01); *H04R 1/028* (2013.01); *H04R 2400/11* (2013.01); *H04R 2499/15* (2013.01)

(56) References Cited

U.S. PATENT DOCUMENTS

| | | | | |
|---|---|---|---|---|
| 6,171,646 | B1* | 1/2001 | Gerhardinger | C03C 17/38 427/165 |
| 6,236,391 | B1* | 5/2001 | Kent | G06F 3/0436 178/18.04 |
| 6,249,091 | B1* | 6/2001 | Belliveau | H05B 37/029 315/312 |
| 6,478,109 | B1* | 11/2002 | Kam | H04R 7/045 181/175 |
| 6,700,709 | B1* | 3/2004 | Fermann | G02B 27/09 359/641 |
| 8,461,443 | B2* | 6/2013 | McKinney | H05B 37/0236 84/610 |
| 2002/0064290 | A1* | 5/2002 | Reynaga | H04R 1/028 381/152 |
| 2003/0233794 | A1* | 12/2003 | Pylkki | E06B 7/28 52/173.1 |
| 2005/0105747 | A1* | 5/2005 | Miyata | G09F 27/00 381/152 |
| 2005/0276427 | A1* | 12/2005 | Kam | H04R 7/045 381/152 |
| 2006/0078131 | A1* | 4/2006 | Booth | G01H 1/00 381/71.1 |
| 2007/0145231 | A1* | 6/2007 | Chen | H01L 21/68728 248/689 |
| 2007/0258604 | A1* | 11/2007 | Bosnecker | H04R 7/045 381/152 |
| 2009/0213573 | A1* | 8/2009 | Furukawa | F21K 9/00 362/97.1 |
| 2010/0071535 | A1* | 3/2010 | McKinney | H05B 37/029 84/464 R |
| 2010/0182308 | A1* | 7/2010 | Holman | G02B 6/0028 345/214 |
| 2011/0045259 | A1* | 2/2011 | Bockmeyer | H01L 51/5268 428/212 |
| 2012/0081881 | A1* | 4/2012 | Mischel, Jr. | H03K 17/78 362/97.1 |
| 2014/0193839 | A1* | 7/2014 | Cunningham | G01J 3/44 435/7.92 |
| 2015/0086063 | A1* | 3/2015 | Louh | H04R 1/028 381/388 |
| 2015/0138157 | A1* | 5/2015 | Harris | G06F 3/016 345/175 |
| 2015/0312661 | A1* | 10/2015 | Okamura | H04R 17/00 381/162 |
| 2015/0355403 | A1* | 12/2015 | Santori | G02B 6/0036 362/606 |

* cited by examiner

GLASS LOUDSPEAKER EMITTING SOUND AND ACCOUSTICALLY-DRIVEN LIGHT

FIELD

The subject matter herein generally relates to audio reproduction.

BACKGROUND

Loudspeaker is widely used in consumer electronic products, such as mobile phone, laptop computers, personal digital assistant, digital camera, flat screen television, and so on. Sound of a traditional speaker is generated by a diaphragm driven by electrical signals.

BRIEF DESCRIPTION OF THE DRAWINGS

Implementations of the present technology will now be described, by way of example only, with reference to the attached figures.

DETAILED DESCRIPTION

Figure 1:
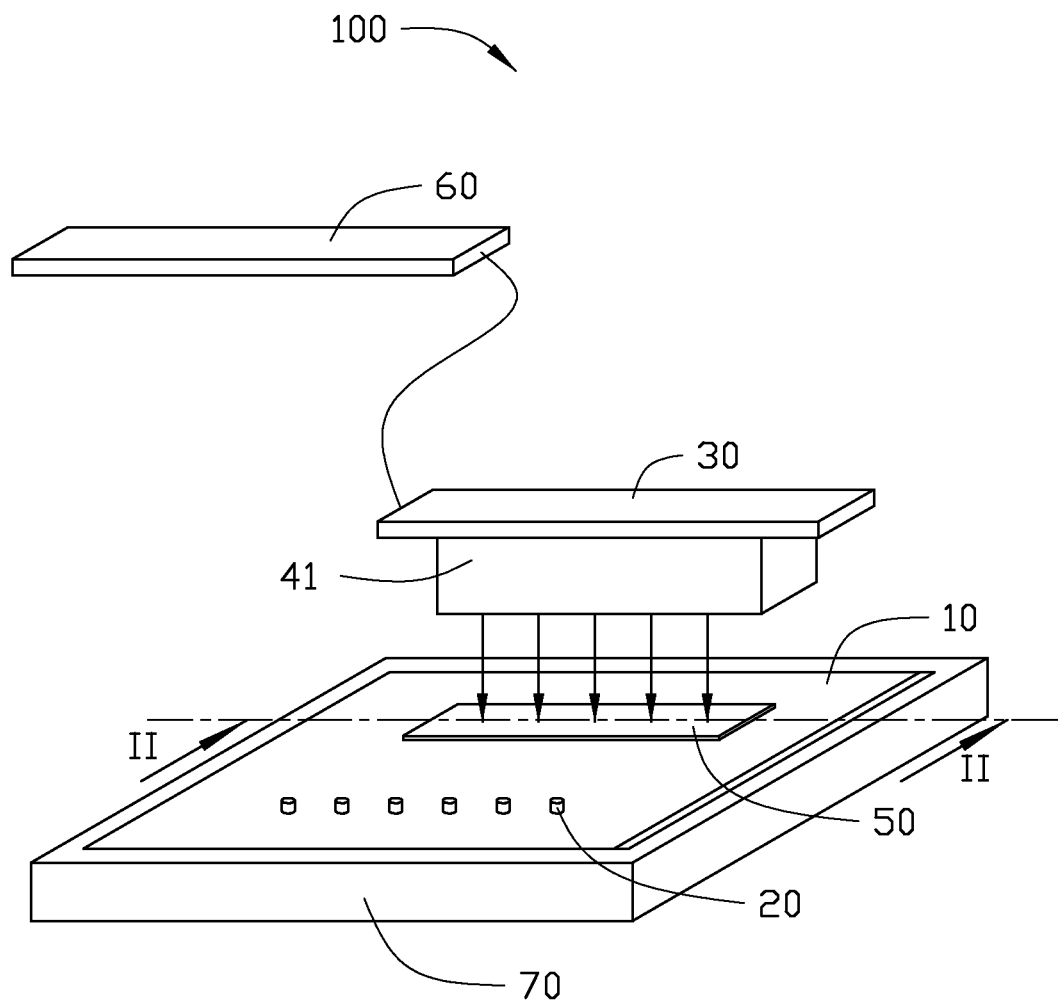
FIG. 1 is an isometric view of a glass loudspeaker, in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references "a plurality of" mean "at least two."

Figure 2:
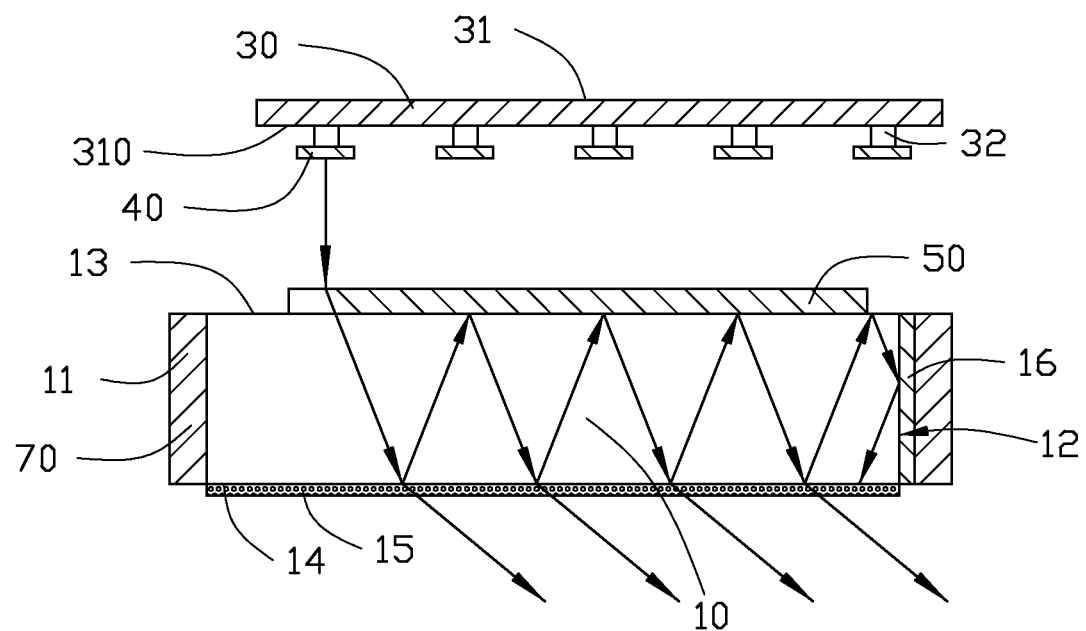
FIG. 2 is a cross-sectional view of the glass loudspeaker of FIG. 1 showing an optical path.
Figure 3:
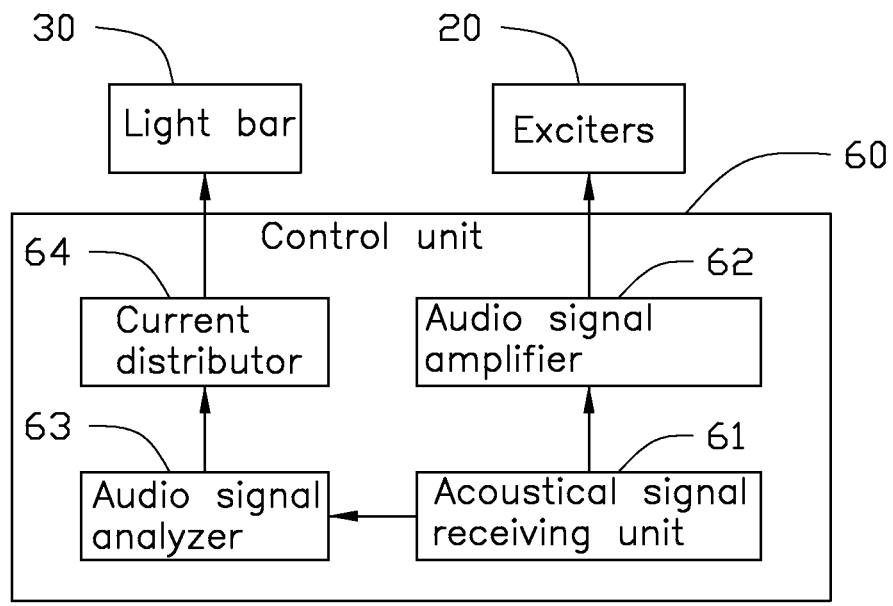
FIG. 3 is a block diagram of the glass loudspeaker of FIG. 1.

FIG. 1 to FIG. 3 show a glass loudspeaker 100. The glass loudspeaker 100 includes a glass substrate 10, a plurality of exciters 20, an LED light bar 30, a plurality of coupling collimators 40, a diffractive grating 50, a control unit 60, and a clamp member 70.

The glass substrate 10 can be a tempered glass and substantially rectangular. The glass substrate 10 includes a first side surface 11, a second side surface 12 opposite to the first side surface 11, a top surface 13 and a bottom surface 14 opposite to the top surface 13. The top surface 13 is a tempered surface. In at least one embodiment, the tempered surface can be tempered to a depth of about 1/20 of a thickness of the whole glass substrate 10. The glass substrate 10 is made from a rigid and high hardness material, thereby the glass substrate 10 is not easy damaged when the exciters 20 are arranged on the top surface 13 and vibrate with a predetermined frequency. A particle scattering layer 15 is arranged on the bottom surface 14. A plurality of particles are disposed in the particle scattering layer 15. Light rays from the light bar 30 which reach the bottom surface 14 will be scattered by the particles in the particle scattering layer 15 and emitted from the bottom surface 14. A reflecting film 16 is arranged on the second side surface 12.

The exciters 20 are directly arranged at intervals on the top surface 13. The exciters 20 can be ceramic oscillators. The exciters 20 are configured for converting electrical energy into mechanical energy, and generating vibrations at predetermined frequency. The vibration is transmitted into the glass substrate 10, and then the glass substrate 10 vibrates the surrounding air to produce sound.

The light bar 30 is arranged toward the top surface 13 and includes a printed circuit board (PCB) 21 and a plurality of light sources 23 evenly spaced apart on the PCB 21. In the illustrated embodiment, the light sources 23 are light-emitting diodes (LEDs). The light sources 23 can be a white light source or selected from a group consisting of red light sources, blue light sources and green light sources, thereby, light rays with different colors will appear at the bottom surface 14.

Each coupling collimator 40 is arranged on the light-emitting path of the light sources 23. A protective casing 41 is arranged outside of the coupling collimators 40. The protecting casing 41 is configured for protecting the light bar 30 and the coupling collimators 40. The coupling collimators 40 collimate light rays from the light source 23, and the light rays can then be directed into the diffractive grating 50.

The diffractive grating 50 is arranged on the top surface 13 and in a direction toward the light bar 30. The diffractive grating 50 diffracts light rays from the coupling collimator 40 into the glass substrate 10. The diffractive grating 50 can be volume holographic optical element or diffractive optical element. A grating equation, $m\lambda = d \sin \theta_m$, is applied, wherein $\lambda$ is the wavelength of the incident light, d is the period of the diffractive grating 50, and $\theta_m$ is diffraction angle of the incident light ray. In the illustrated embodiment, m=1, light rays from the light bar 30 are perpendicularly incident into the diffractive grating 50, and then, the rays are emitted from the diffractive grating 50, and the emitted light rays are deflected relative to the incident light rays.

The control unit 60 is electrically connected with the light bar 30 and the exciters 20. The control unit 60 includes an acoustic signal receiving unit 61, an audio signal amplifier 62, an audio signal analyzer 63, and a current distributor 64. The acoustic signal receiving unit 61 is configured to receive an external acoustic signal. The audio signal amplifier 62 is configured to receive the acoustic signal from the acoustic signal receiving unit 61 and amplify the audio signal. Then, the audio signal analyzer 63 can transmit the amplified audio signal to each exciter 20. The audio signal analyzer 63 is configured to analyze the acoustic signal and obtain an intensity amplitude of the acoustic signal, and convert the intensity amplitude signal of the audio signal into current intensity signal and transmit it to the current distributor 64. The current distributor 64 distributes the current intensity signal to each light source 23, whereby the light source 23 emits light. Specifically, as shown in FIG. 2, an optical path of one of the light sources 23 is illustrated. Optical paths of other light sources 23 can be similar.

The clamp member 70 is arranged at a periphery of the glass substrate 10 and clamps the glass substrate 10. The clamp member 70 is configured to absorb a vibration of the periphery of the glass substrate 10 to prevent the periphery of the glass substrate 10 from shivering and producing noise when the exciters 20 vibrate. In the illustrated embodiment, the clamping member 70 is made of rubber or foam cushion.

In operation of the glass loudspeaker 100, the audio signal receiving unit 61 is configured to receive an input acoustic signal. The audio signal amplifier 62 receives the acoustic signal from the sound receiving unit 61 and converts the acoustic signal into audio signal. The audio signal is amplified and transmitted to each exciter 20. Each exciter 20 receives the audio signal and produces a stable vibration. The vibration is transmitted into the glass substrate 10, and then, the glass substrate 10 agitates the surrounding air to produce sound. Thus, the glass loudspeaker 100 functions as a sound emitter.

At the same time, the audio signal analyzer 63 receives the audio signal from the acoustic signal receiving unit 61 and analyzes. Then, the audio signal analyzer 63 obtains a vibration amplitude of the audio signal. Light rays emitted from light source 23 are collimated by the coupling collimator 40 and reach the diffractive grating 50 vertically. The light rays are diffracted by the diffractive grating 50, and then, the light rays enter into the glass substrate 10. Relative to the surrounding air, the glass substrate 10 is a medium which is optically denser, therefore light rays satisfy the condition of total reflection, so the light rays are reflected and spread between the top surface 13 and the bottom surface 14. The part of the light rays which reach the bottom surface 14 are scattered by the particle scattering layer 15 and are emitted from the bottom surface 14. The part of the light rays which reach the reflecting film 16 are reflected by the reflecting film 16 and re-enter the glass substrate 10. Since the current intensity is determined by an intensity amplitude of the audio signal, the current intensity determines a degree of brightness and darkness of the light sources 23 change with the amplitude signal of the audio signal, and degrees of brightness and darkness of the light source 23 appear from the bottom surface 14. Thus, the glass loudspeaker 100 also realizes a visual function as well as an audible function.

Figure 4:
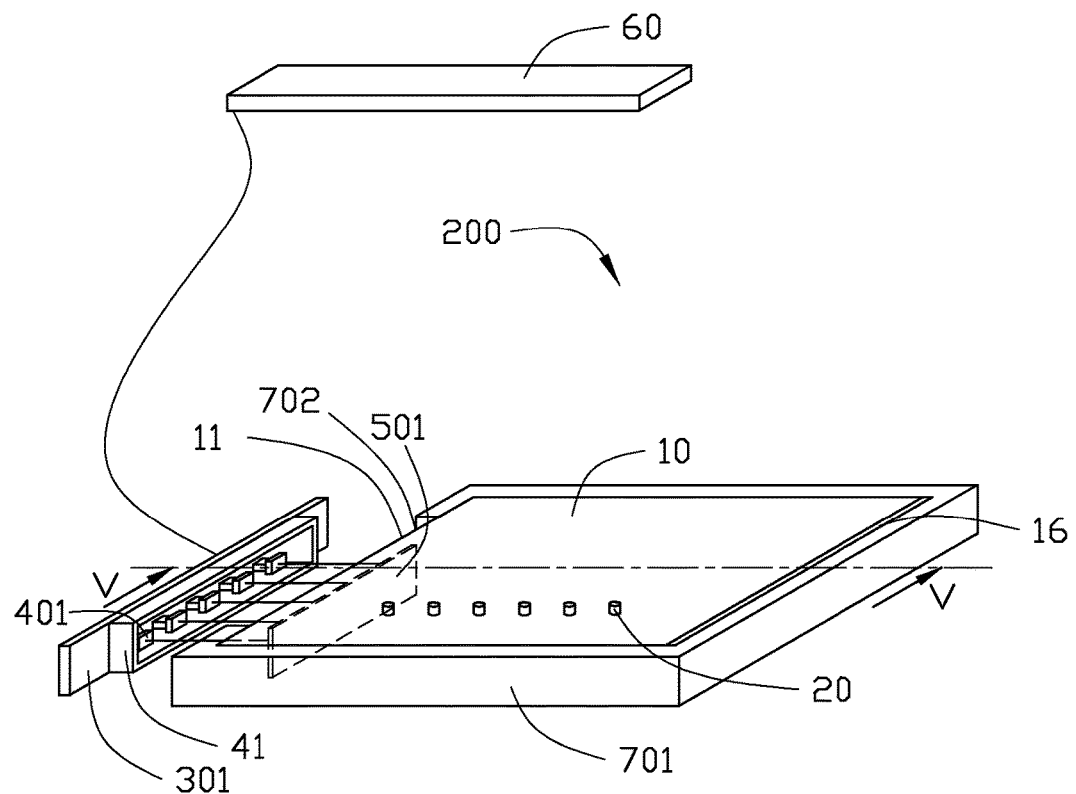
FIG. 4 is an isometric view of a glass loudspeaker, in accordance with a second embodiment.
Figure 5:
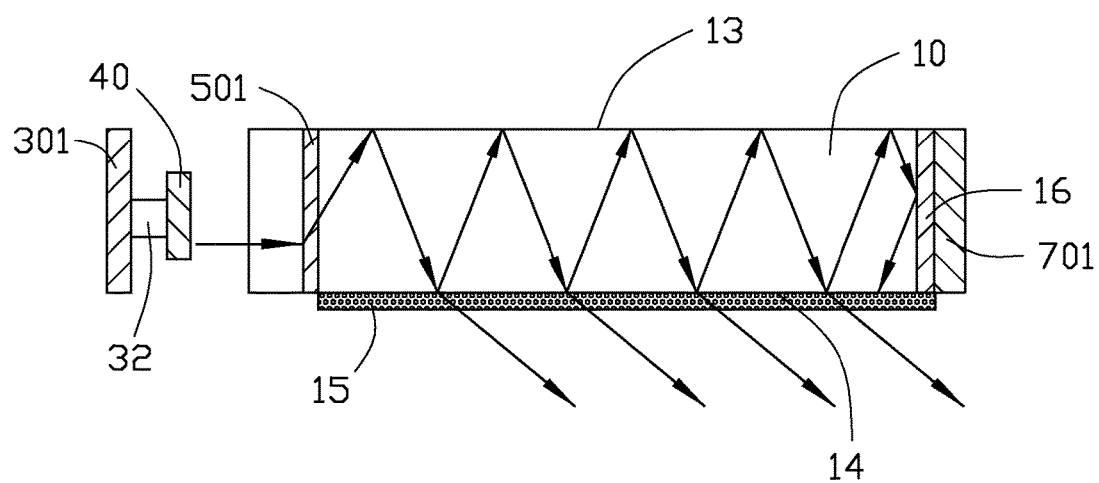
FIG. 5 a cross-sectional view of the glass loudspeaker of FIG. 4 showing an optical path.

A glass loudspeaker 200 according to a second embodiment is shown in FIGS. 4 and 5. The glass loudspeaker 200 in FIG. 4 is similar to the glass loudspeaker 100 in FIG. 1. The difference between the glass loudspeaker 200 and the glass loudspeaker 100 in FIG. 1 is that the clamp member 701 has a cutout 702 at the first side surface 11 The diffractive grating 50 is arranged at the cutout 702 and in contact with the first side surface 11, the light bar 30 being disposed toward the first side surface 11. The working principle of the glass loudspeaker 200 is similar to that of the glass loudspeaker 100.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A glass loudspeaker configured to emit sound and acoustically-driven light, the glass loudspeaker comprising:
   a glass substrate comprising a top surface and a bottom surface opposite to the top surface;
   a plurality of exciters being arranged at spaced apart intervals on the top surface;
   a light bar being arranged in a direction toward the top surface and comprising a printed circuit board and a plurality of light sources evenly spaced apart on the printed circuit board;
   a plurality of coupling collimators, each of the plurality of coupling collimators being arranged on a light path of a corresponding one of the plurality of light sources for collimating light rays emitted by the plurality of light sources;
   a diffractive grating being arranged on the top surface and in a direction toward the light bar; and
   a control unit electrically connected with the light bar and the exciters, the control unit comprising:
      an acoustic signal receiving unit configured to receive an acoustic signal from an external source;
      an audio signal amplifier configured to receive the acoustic signal from the acoustic signal receiving unit;
      an audio signal analyzer analyze the acoustic signal and obtain an intensity amplitude of the acoustic signal; and
      a current distributor,
   wherein the audio signal analyzer is configured to convert the intensity amplitude of the audio signal into current intensity signal and transmit the current intensity signal to the current distributor, which distributes the current intensity signal to each of the plurality of light sources; and
   wherein when the light collimated by the plurality of coupling collimators reaches the diffractive grating, the diffractive grating diffracts the light to cause the light to slantly enter the glass substrate, thereby causing a portion of the diffracted light to spread between the top surface and the bottom surface, and another portion of the diffracted light to be emitted through the bottom surface of the glass substrate.

2. The glass loudspeaker of claim 1, further comprising a clamp member, the clamp member being arranged at a periphery of the glass substrate and configured to clamp the glass substrate.

3. The glass loudspeaker of claim 2, wherein the clamping member is made of rubber or foam cushion.

4. The glass loudspeaker of claim 3, wherein the top surface is a tempered surface, and a tempered thickness of the glass substrate is 1/20 of a thickness of the whole glass substrate.

5. The glass loudspeaker of claim 1, wherein the glass substrate further comprises a particle scattering layer arranged at the bottom surface of the glass substrate.

6. The glass loudspeaker of claim 1, wherein the glass substrate comprises a side surface, the glass loudspeaker further comprises a reflecting film arranged on the side surface of the glass substrate.

7. A glass loudspeaker configured to emit sound and acoustically-driven light, the glass loudspeaker comprising:
- a glass substrate comprising a top surface, a bottom surface opposite to the top surface, a first side surface and a second side surface opposite to the first side surface;
- a plurality of exciters being arranged at spaced apart intervals on the top surface;
- a light bar being arranged toward the first side surface and comprising a printed circuit board and a plurality of light sources evenly spaced apart on the printed circuit board;
- a plurality of coupling collimators, each coupling collimators being arranged on light path of corresponding one of the light sources for collimating light rays emitted by the plurality of light sources;
- a diffractive grating being arranged on the first side surface and in a direction toward the light bar; and
- a control unit electrically connected with the light bar and the exciters, the control unit comprising:
  - an acoustic signal receiving unit configured to receive an acoustic signal from an external source;
  - an audio signal amplifier configured to receive the acoustic signal from the acoustic signal receiving unit;
  - an audio signal analyzer analyze the acoustic signal and obtain an intensity amplitude of the acoustic signal; and
  - a current distributor,
  - wherein the audio signal analyzer is configured to convert the intensity amplitude of the audio signal into current intensity signal and transmit the current intensity signal to the current distributor, which distributes the current intensity signal to each of the plurality of light sources; and
  - wherein when the light collimated by the plurality of coupling collimators reaches the diffractive grating, the diffractive grating diffracts the light to cause the light to slantly enter the glass substrate, thereby causing a portion of the diffracted light to spread between the top surface and the bottom surface, and another portion of the diffracted light to be emitted through the bottom surface of the glass substrate.

8. The glass loudspeaker of claim 7, further comprising a clamp member, the clamp member being arranged at a periphery of the glass substrate and configured to clamp the glass substrate.

9. The glass loudspeaker of claim 8, wherein the clamping member is made of rubber or foam cushion.

10. The glass loudspeaker of claim 7, wherein the top surface is a tempered surface, and a tempered thickness of the glass substrate is $1/20$ of a thickness of the whole glass substrate.

11. The glass loudspeaker of claim 7, wherein the glass substrate further comprises a particle scattering layer arranged at the bottom surface of the glass substrate.

12. The glass loudspeaker of claim 7, wherein the glass loudspeaker further comprises a reflecting film arranged on the second side surface of the glass substrate.

* * * * *